(12) United States Patent
Knutson et al.

(10) Patent No.: US 7,873,607 B1
(45) Date of Patent: Jan. 18, 2011

(54) MODEL DRIVEN CONSOLIDATOR OF DATABASE INFORMATION

(76) Inventors: Stanley G. Knutson, 2211 Bridgepointe Pkwy., Suite 300, San Mateo, CA (US) 94404; Nathan D. T. Boyd, 2211 Bridgepointe Pkwy., Suite 300, San Mateo, CA (US) 94404; Sudhir M. Rao, 2211 Bridgepointe Pkwy., Suite 300, San Mateo, CA (US) 94404; Deepak Jain, 2211 Bridgepointe Pkwy., Suite 300, San Mateo, CA (US) 94404

( * ) Notice: Subject to any disclaimer, the term of this patent is extended or adjusted under 35 U.S.C. 154(b) by 152 days.

(21) Appl. No.: 11/178,252

(22) Filed: Jul. 7, 2005

(51) Int. Cl.
*G06F 7/00* (2006.01)

(52) U.S. Cl. ............... 707/692; 707/694; 707/999.101

(58) Field of Classification Search ............ 707/101, 707/102, 201, 103 Z
See application file for complete search history.

(56) References Cited

U.S. PATENT DOCUMENTS

| 6,748,394 | B2 * | 6/2004 | Shah et al. ............... 707/102 |
| 2003/0046280 | A1 * | 3/2003 | Rotter et al. ............... 707/6 |
| 2005/0086360 | A1 * | 4/2005 | Mamou et al. ............... 709/232 |
| 2005/0222931 | A1 * | 10/2005 | Mamou et al. ............... 705/35 |
| 2006/0179431 | A1 * | 8/2006 | Devanathan et al. ........ 717/168 |
| 2006/0271528 | A1 * | 11/2006 | Gorelik ............... 707/3 |
| 2007/0118504 | A1 * | 5/2007 | Subramaniam et al. ........ 707/3 |

* cited by examiner

*Primary Examiner*—Neveen Abel Jalil
*Assistant Examiner*—Vei-Chung Liang
(74) *Attorney, Agent, or Firm*—Ohlandt, Greeley, Ruggiero & Perle, LLP

(57) ABSTRACT

A method for specifying a consolidator for consolidating data from a plurality of database systems is disclosed. The method comprises receiving a user action wherein the user action specifies an action that modifies a knowledge base wherein the knowledge base includes schema information and matching information relating to the plurality of database systems. The method further comprises deriving an event from the user action wherein the event triggers a consistency rule that causes a modification of the knowledge base and generating from the knowledge base a registry that comprises the consolidator wherein the registry includes a master database and a consolidator application.

26 Claims, 10 Drawing Sheets

MODEL DRIVEN CONSOLIDATOR OF DATABASE INFORMATION

BACKGROUND OF THE INVENTION

Many organizations use database systems to organize information. It is not uncommon for an organization to use multiple database systems. For example, a large business may use one system for customer relation management, one system for billing, one system to gather information from a web portal, one system for enterprise resource planning, and one system for customer support. These and other systems are referred to generically as database systems. Because of the multiple systems, there are differences in the information in the different databases even if the information is tied to the same customer company, supplier company, person, product or material. In some cases, the information is not the same because the company has moved, changed name, merged, or been acquired. There may be multiple records in one database or multiple databases that all refer to the same company. In some cases, the multiple records arise because a database record was input with a spelling difference in company name or the company name was entered with a different punctuation or capitalization (i.e. Company Name, Inc. or Company Name Incorporated). It is useful if the database information is consolidated into one list eliminating differences in or multiple copies of information.

One problem that arises in consolidating database information is that it is difficult to achieve the flexibility required in the consolidator of database information. For example, the consolidator takes its input from a number of database systems. Each of these systems has different information and different information structures which may be standard configurations for a given database system product or may be a customized version of a database system. Also, the comparisons required between database systems are different. Because each database system has different information structures, different information processing is required for a given user of the information structures from the different database systems to yield useful consolidator output information. And, the consolidator output for a given user will ideally take a customized form so that the information can be most effectively used. It would be useful if the consolidator could be flexible in its input, processing, and output in consolidating the information from different database systems.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Specifying a consolidator for consolidating data from a plurality of database systems is disclosed. The consolidator is a system for combining or merging data or information from different database systems. Specifying a consolidator comprises receiving a user action wherein the user action specifies an action that modifies a knowledge base. The knowledge base includes schema information and matching information relating to the plurality of database systems. Schema information is information regarding database structures and their sources, entities, and attributes. Matching information is information regarding which information should match with which information (i.e. the fields in a record that are to be compared for matching), how it should be matched (i.e. the comparison should be made), and how it should be shown if it does match. Specifying a consolidator further comprises deriving an event from the user action wherein the event triggers rules that further modify the knowledge base and generating from the knowledge base a registry that comprises the consolidator wherein the registry includes a master database and a consolidator application. In some embodiments, the registry is a customer hub. The consolidator application is run to enter information from the plurality of input databases into the master database. In some embodiments, the consolidator application is a web application.

Figure 1:
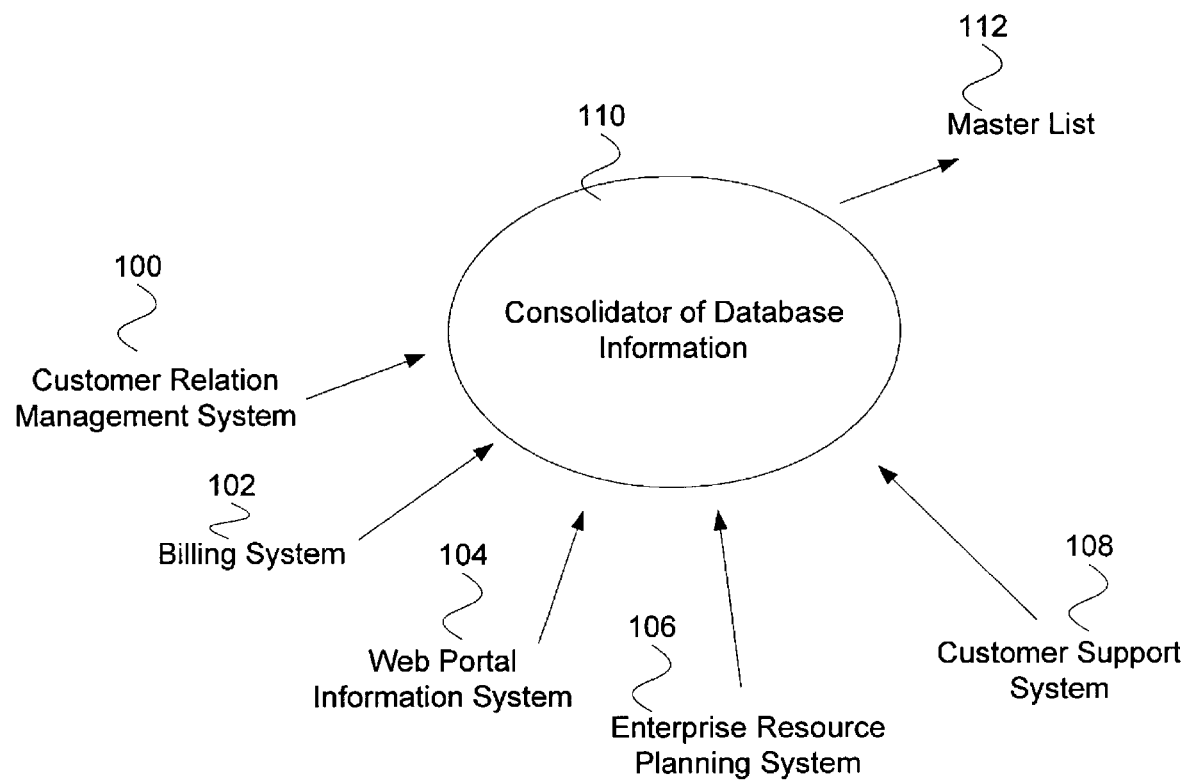
FIG. 1 illustrates an embodiment of a consolidator of database information.

FIG. 1 illustrates an embodiment of a consolidator of database information. In the example illustrated, consolidator 110 takes as input the databases of a number of systems. The input systems include customer relation management database 100, billing system 102, web portal information system 104, enterprise resource planning system 106, and customer support system 108. In various embodiments, the input systems may also include vendor management systems, product life cycle management systems, material resource management systems, or material resource planning systems. Consolidator 110 has as output a master list 112. The master list is a linked list of database records.

Figure 2:
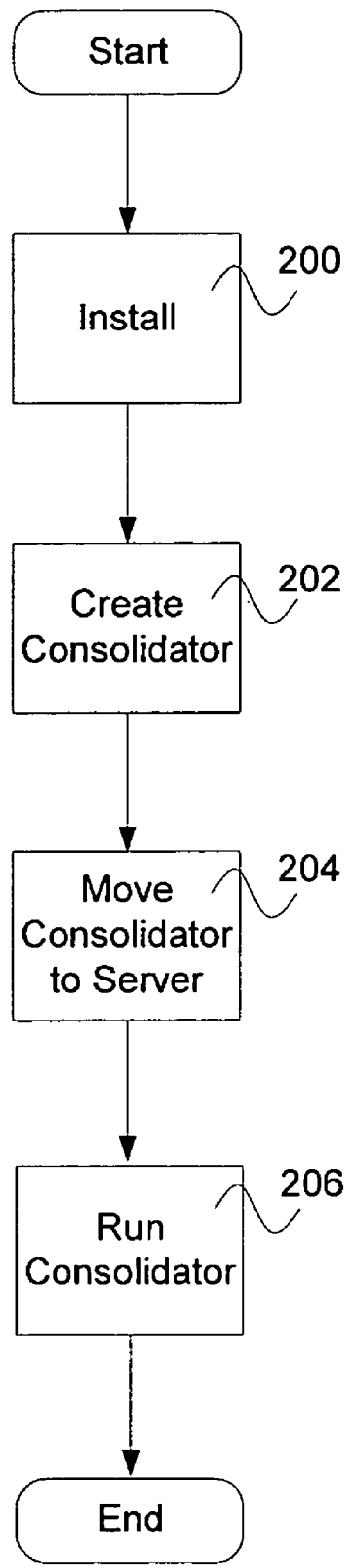
FIG. 2 illustrates an embodiment of a process for using a consolidator system for the consolidation of database information.

FIG. 2 illustrates an embodiment of a process for using a consolidator system for the consolidation of database information. In 200, knowledge base driven, or model driven, software is installed. In 202, a consolidator is created using the knowledge base driven software. In 204, the consolidator is moved to a server. In 206, the consolidator is run. The consolidator is run during which database system information is accessed to create a consolidated, or master, database.

Figure 3:
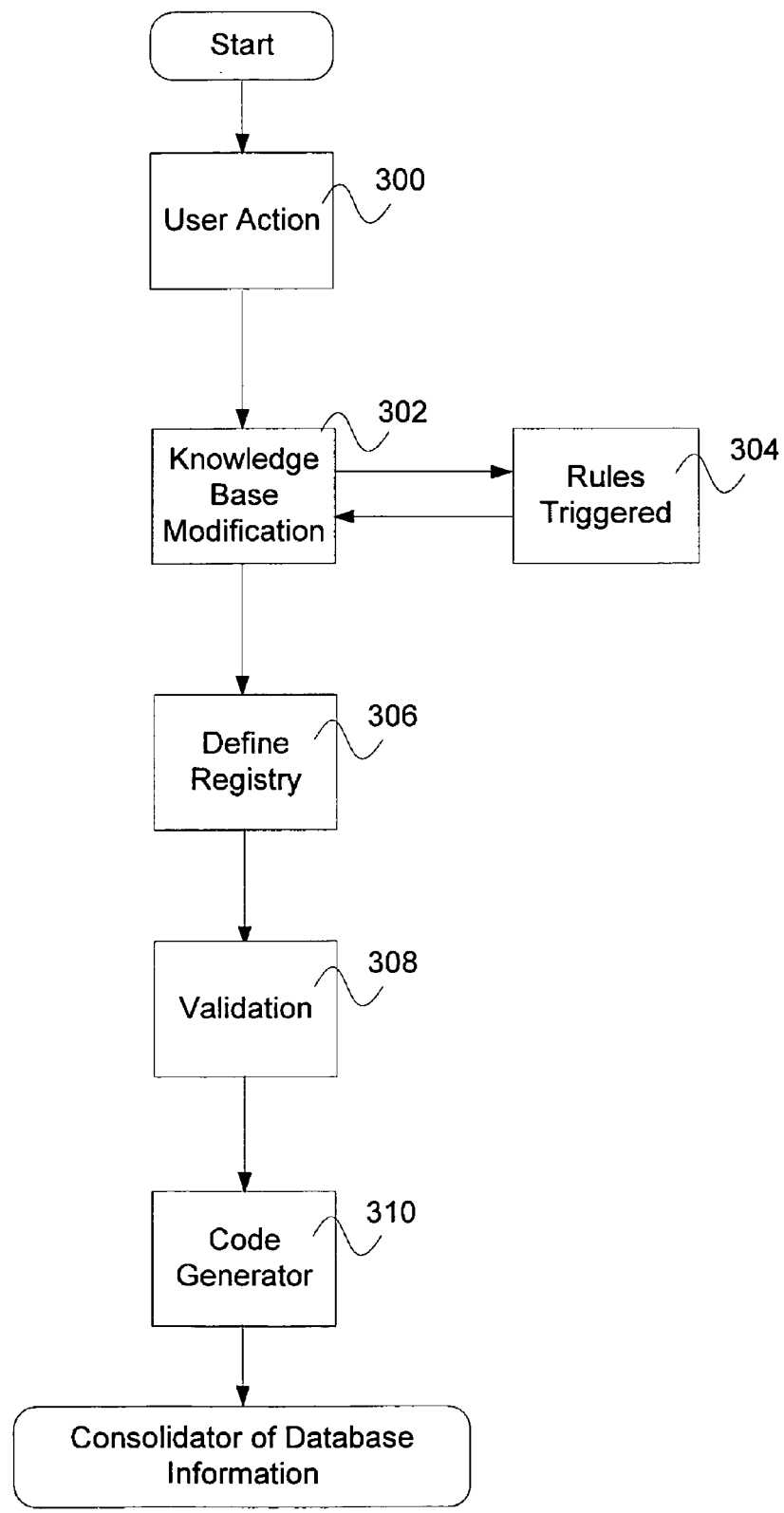
FIG. 3 illustrates an embodiment of a process for creating a consolidator.

FIG. 3 illustrates an embodiment of a process for creating a consolidator. In some embodiments, the process in FIG. 3 is used to implement 202 of FIG. 2. In 300, a user action occurs. A user action includes the design of variables and displays, the design of the way to compare or match variables, the designation of the sources for the database input and their format, and the designation of the reliability of information. In 302, the knowledge base is modified according to the user action. For example, a source is added by the user. This modifies the knowledge base to handle information that describes where the information comes from in the source, how the information is handled, and how the information is displayed.

In 304, rules are triggered by the user action which causes a modification of the knowledge base. An event is derived from the user action, which causes a modification of the knowledge base. The event triggers a consistency rule which generates an action that modifies the knowledge base. An event is derived from the action which causes a modification of the knowledge base. The event can again trigger a consistency rule. In some embodiments, a consistency rule is that when a master entity is added to the knowledge base, the master entity is required to have ordering, all ordering attributes, and a corresponding staged entity. In some embodiments, a consistency rule is that when a staged entity is deleted, native attribute and ordering information corresponding to the staged entity is also required to be deleted. In some embodiments, an example of a master entity is a company. In some embodiments, a master entity is an entity that is constructed out of two records that are found to match. Within the matched records the fields are merged to create the best entity. The entity has references back to the original records. The entity also has ordering, display, and other information accompanying it. In some embodiments, a consistency rule is that in the definition of top down searching, there must be a level for each master entity. Top down searching is a way of identifying match candidates at the top level by searching from the top level down in each of the candidate database entries to identify the matching between the database entries.

In 306, the registry is defined. The knowledge base specified by the user modifications and the rule required modifications is used to define the registry. The registry, or customer hub, includes specifications for master entities, sources, match configurations, reporting, and general items.

In 308, the registry is validated. Validation uses rules to see if the registry as a whole is consistent. In some embodiments, a validation rule is that there are no duplicate display names for master entities. In some embodiments, a validation rule is that a database table name length is less than sixteen characters long and only contains valid characters (i.e. no question marks, no spaces). In some embodiments, a validation rule is that a match level must have a match comparison. In some embodiments, there are levels in the data structure: company, site, and person. An example of a match level is which levels (company, site, or person) are involved in the matching. An example of a match comparison is how the levels are compared. In some embodiments, a match level and match comparison are that in one match comparison the company name and the last name of the CEO are compared to see if they match In some embodiments, a validation rule is that every native attribute must have a cleanse alternative. For example, for the native attribute address1 and address2, the cleanse alternative for address1 is street number and street address, and the cleanse alternative for address2 is city, state, and zip, where a cleanse alternative contains the same information as or separated information from the original, or native attribute.

In 310, code is generated for the consolidator. In some embodiments, computer code is generated includes computer code that interacts with the input databases, computer code that interacts with the user of the consolidator, computer code that processes the information from the input databases, and computer code that interacts with the master database.

Figure 4:
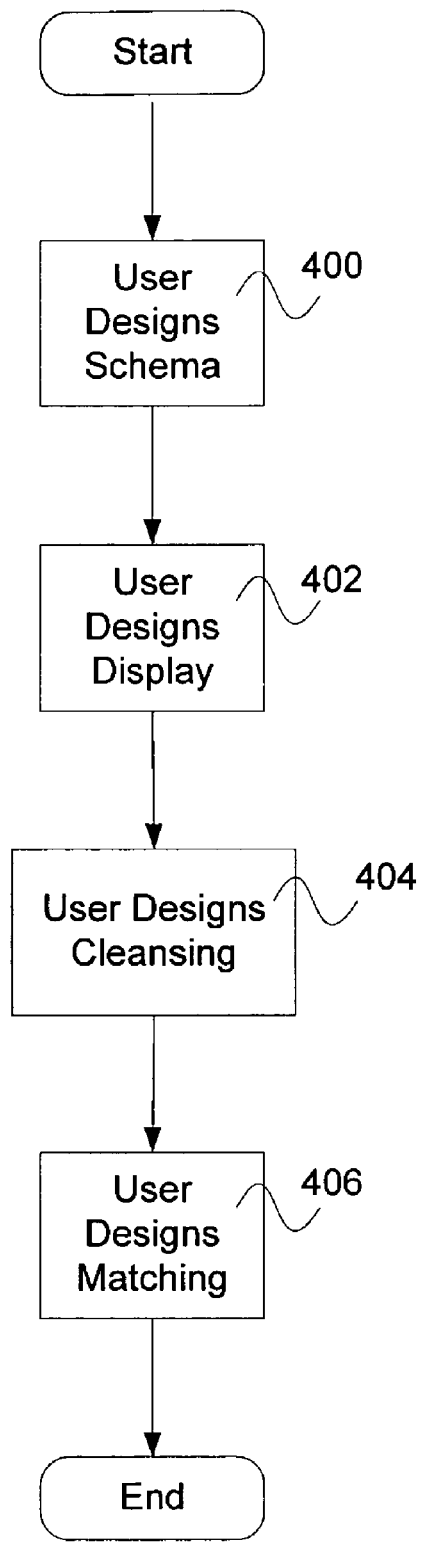
FIG. 4 illustrates an embodiment of a process for user action.

FIG. 4 illustrates an embodiment of a process for user action. In 400, the user designs schema. In some embodiments, the process in FIG. 4 is used to implement 300 of FIG. 3. In the example illustrated, design refers to the specifying of the item or process. The user designs the structure and attributes of the database structures and their sources, entities, and attributes. In 402, the user designs displays or user interfaces. These displays indicate the format for the way variables and other information are shown to the user. In 404, the user designs cleansing. Cleansing refers to the process for extracting information from a specified input database, processing the information to be appropriate for the master database, and loading into the appropriate data structures in the master database. In 406, the user designs matching. Matching refers to the process of determining that two sets of information are related to each other. In some embodiments, the set of information is a simple variable (i.e. a phone number). In some embodiments, the set of information is a complex data structure with many variable entries (i.e. a company with associated information: address, phone numbers, sites, site addresses, site phone numbers, number of employees, revenue information, personnel information, etc.). In some embodiments, the relation between the sets of information is determined to be that the sets are closely related (i.e. a hard match), partially related (i.e. a soft match), and not related (i.e. no match). The design of matching specifies the variables or portions of variables to examine, how the variables should be related to each other, the matching engine, how the variables should be merged if they are closely related, and the search types, the levels and the passes that are performed during identifying candidates for matching. In some embodiments, the search types for identifying candidates for matching are bottom up searching, top down searching, and transaction searching.

Figure 5:
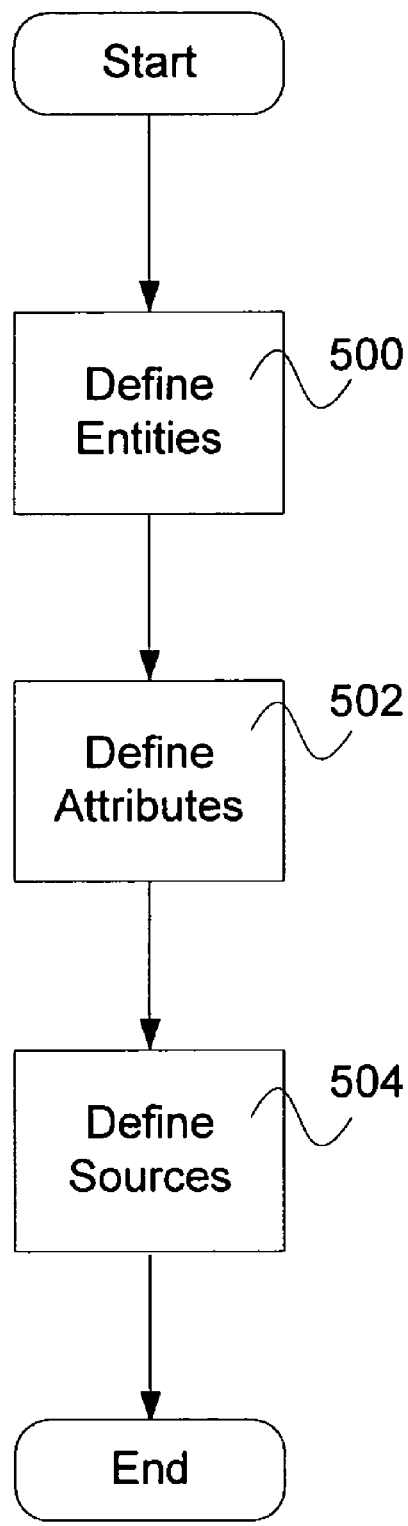
FIG. 5 illustrates an embodiment of a process for designing schema.

FIG. 5 illustrates an embodiment of a process for designing schema. In some embodiments, the process in FIG. 5 is used to implement 400 of FIG. 4. In 500, entities are defined. Entities are the database structures in the master database. In 502, attributes are defined. Attributes are fields contained by the entities (i.e. PhoneNumber). In 504, sources are defined. Sources are the source database entries for the master database entries.

Figure 6:
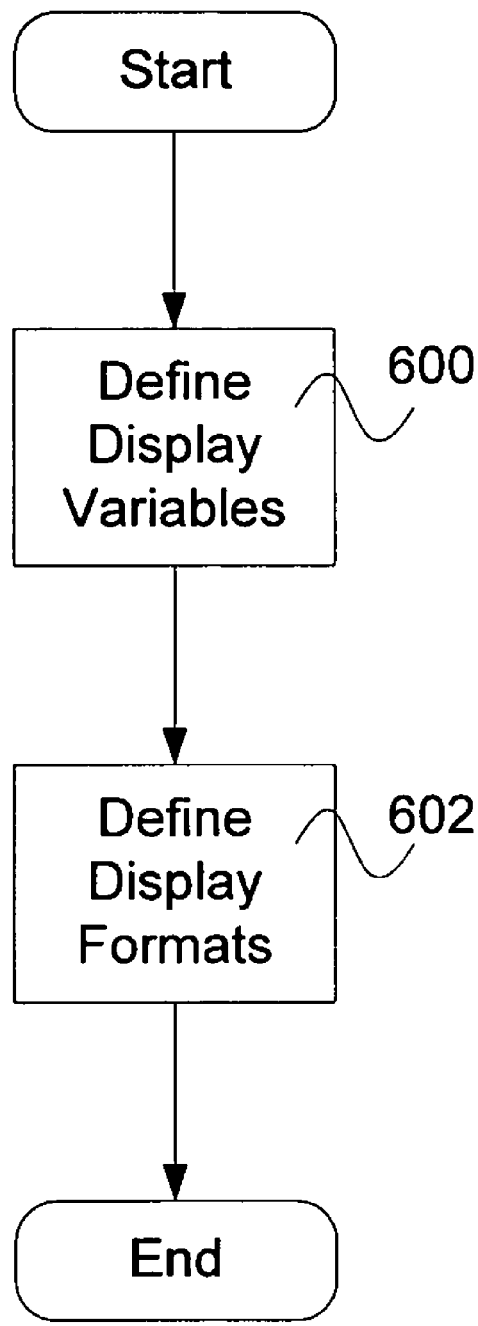
FIG. 6 illustrates an embodiment of a process for designing displays.

FIG. 6 illustrates an embodiment of a process for designing displays. In some embodiments, the process in FIG. 6 is used to implement 402 of FIG. 4. In 600, display or user interface variables are defined. Display variables are the variables that are displayed for the user. In 602, display or user interface formats are defined. Display formats are the placement, format, and manner that the display variables are displayed for the user.

Figure 7:
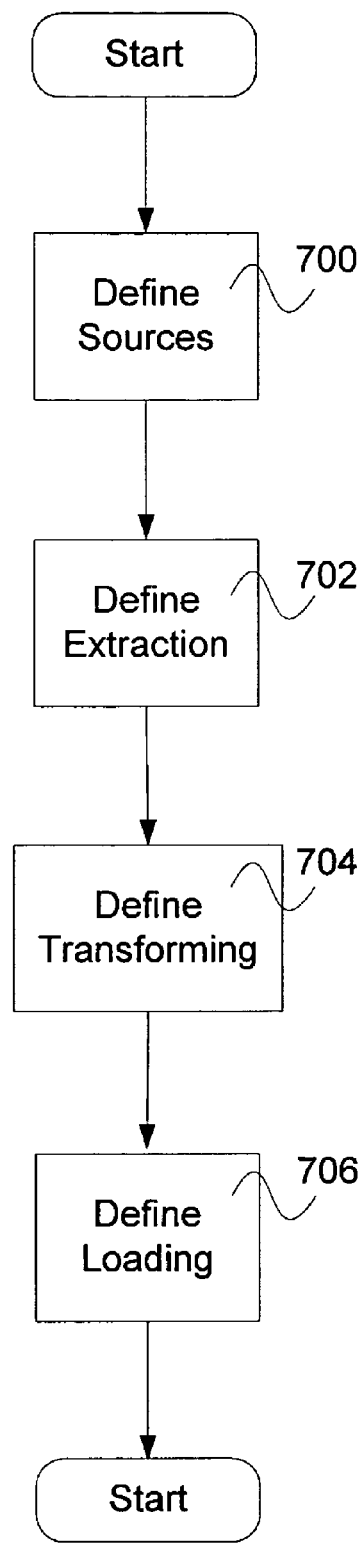
FIG. 7 illustrates an embodiment of a process for designing cleansing.

FIG. 7 illustrates an embodiment of a process for designing cleansing. In some embodiments, the process in FIG. 7 is used to implement 404 of FIG. 4. In 700, sources are defined. Sources are the input database fields or variables from which data is gathered. In 702, extraction is defined. Extraction is the portion of the variables used from the source. In 704, transforming is defined. Transforming is the data processing to put the extracted input variables in the proper format for and data structures in the master database. In 706, loading is defined. Loading is the insertion of the transformed extracted data from the source into the master database.

Figure 8:
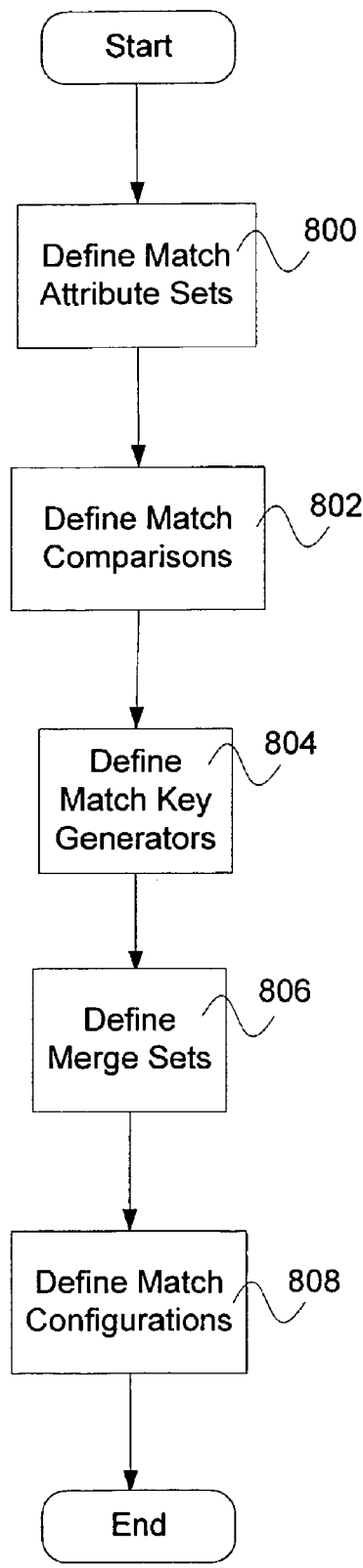
FIG. 8 illustrates an embodiment of a process for designing matching.

FIG. 8 illustrates an embodiment of a process for designing matching. In some embodiments, the process in FIG. 8 is used to implement 406 of FIG. 4. In 800, match attribute sets are defined. Match attribute sets are the sets of attributes or variables that are used in the comparisons. In 802, match comparisons are defined. Match comparisons are the comparisons between match attribute sets. In some embodiments, the comparisons involve determining a match goodness value. In some embodiments, the comparisons involve setting a threshold above which the match goodness value must be in order to be said to match. In 804, match key generators are defined. Match key generators are used to narrow potential comparisons in the database. In some embodiments, a match key generator uses specified fields in a record and creates keys. Ranges of keys are used to narrow the comparisons. In some embodiments, the key generation is a hash function. In 806, merge sets are defined. Merge sets are the sets of attributes or variables that are used to merge matched attributes into the master database and rules involved in merging. In some embodiments, a merge rule is that recent data is trusted more than older data so that the recent data is used as the data input to the master database. In some embodiments, a merge rule is that the longer name is better than a shorter name so that the longer name is used as the data input to the master database. In 808, match configurations are defined. Match configurations are specifications of the levels, the types of searches, and the passes that are performed during identifying candidates for matching. In some embodiments, the types of searches include bottom up searching, top down searching, and transaction searching for identifying candidates for matching.

Figure 9:
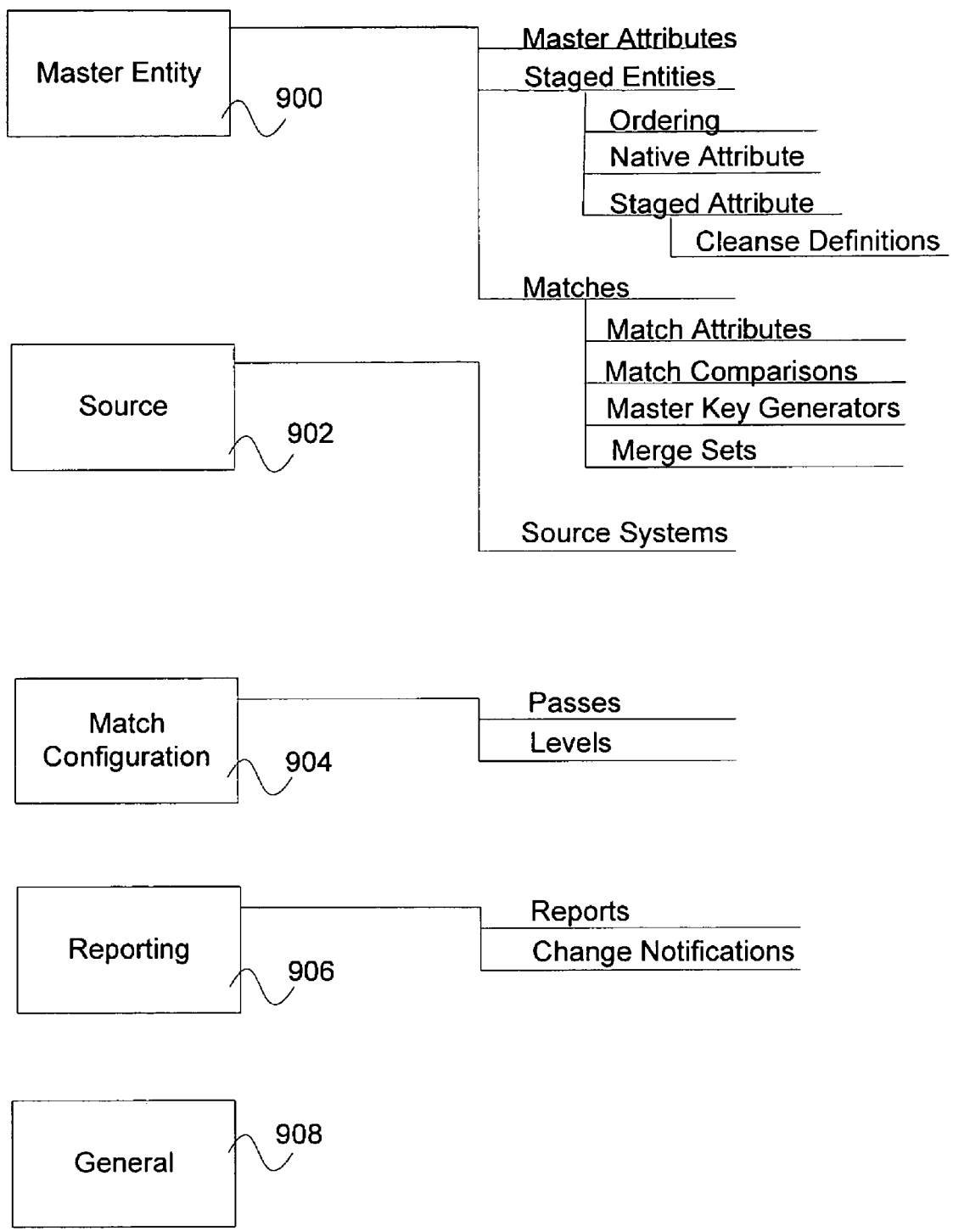
FIG. 9 illustrates an embodiment of a registry definition.

FIG. 9 illustrates an embodiment of a registry definition. In the example illustrated, master entity 900 is comprised of master attributes, staged entities, and matches. Staged entities are comprised of ordering, native attributes, and staged attributes. Staged attributes are comprised of cleanse definitions. Matches are comprised of match attributes, match comparisons, master key generators, and merge sets. In some embodiments, a master entity is a company. In some embodiments, master attributes are the variables CEO_last_name and CEO_first_name which contain the first and last name of the company's CEO. In some embodiments, a staged entity is the variable vt_company which contains the name of the company. In some embodiments, a staged attribute is CEO_first and CEO_last which was derived by processing from a source database the variable CEO_full_name.

Source 902 is comprised of source systems. Source systems are the database systems that input data or information into the master database. Match configuration 904 is comprised of passes and levels. Passes are the type and number of the search types for identifying candidate matching. Levels are the levels of the database structures involved in the search type for identifying candidate matching. Reporting 906 is comprised of reports and change notifications. Reports are the reports that the user receives regarding the consolidation of database information. Change notifications are the notifications that occur when a record has changed. For example, if a record is updated indicating that a company has moved, then a change notification is sent by email to the sales team indicating that the address of the company has changed. General 908 are general configuration parameters including database connection information (for example, name of database computer, protocol connection information, database name, etc.), user timeout information, web server information (for example, Uniform Resource Locator (URL)), etc.

Figure 10:
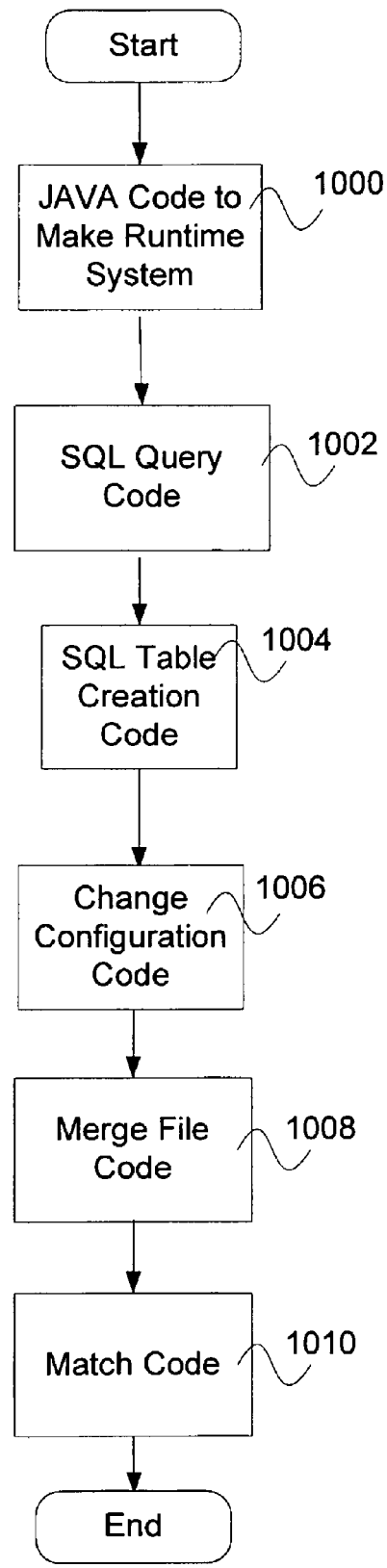
FIG. 10 illustrates an embodiment of a process for code generation.

FIG. 10 illustrates an embodiment of a process for code generation. In some embodiments, the process in FIG. 10 is used to implement 310 of FIG. 3. In 1000, JAVA™ code is generated. The JAVA™ code includes code for the runtime consolidator system. In 1002, SQL query code is generated. The SQL query code includes code for the interaction with the input databases and the interaction with the master database. In 1004, SQL table creation code is generated. The SQL table creation code includes code for the creation of the master database. In 1006, change configuration code is generated. The change configuration code includes code for changing existing registry code to work with the new definitions of the consolidator. In some embodiments, the consolidator definition is updated, change configuration code is generated so that the existing master database can be used with the updated consolidator. In 1008 merge file code is generated. The merge file code includes code for merging. In 1010, match code is generated. The match file code includes code for matching Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for creating a consolidator for consolidating data from a plurality of database systems comprising:

receiving a user action wherein the user action specifies an action that modifies a knowledge base, wherein the knowledge base includes schema information and matching information relating to the plurality of database systems;

deriving, using a processor, an event from the user action wherein the event causes a first modification of the knowledge base, which in turn triggers consistency rules that cause a second modification of the knowledge base, wherein the consistency rules are that:

(a) when a master entity is added to the knowledge base, the master entity is required to have (i) a corresponding staged entity, wherein staged entity data is derived from processing data from one of the plurality of database systems, and wherein said staged entity comprises a staged attribute comprising a cleanse definition, (ii) ordering, and (iii) all ordering attributes;

(b) when a staged entity is deleted, native attribute and ordering information corresponding to the staged entity is also deleted; and (c) in a top down search, there is a level for each master entity;

defining a registry using the modified knowledge base, wherein the registry comprises a master database and a consolidator application;

validating the registry in accordance with a validation rule selected from the group consisting of:

(a) that a match level must have a match comparison;

(b) that every native attribute has a cleanse attribute; and (c) a combination thereof; and generating, based at least in part on the registry, a set of consolidator application computer code, wherein the set of consolidator application computer code (a) includes computer code that interacts with input databases in the plurality of database systems, computer code that interacts with a user of the consolidator, computer code that processes data from the input databases, and computer code that interacts with the master database, and (b) when executed, consolidates data from the input data databases into the master database in accordance with the knowledge base.

2. A method as recited in claim 1, wherein the knowledge base includes user interface information.

3. A method as recited in claim 1, wherein the knowledge base includes cleansing information.

4. A method as recited in claim 1, wherein the knowledge base includes source information.

5. A method as recited in claim 1, wherein the knowledge base includes entity information.

6. A method as recited in claim 1, wherein the knowledge base includes attribute information.

7. A method as recited in claim 1, wherein the knowledge base includes match attribute set information.

8. A method as recited in claim 1, wherein the knowledge base includes match comparison information.

9. A method as recited in claim 1, wherein the knowledge base includes match key generator information.

10. A method as recited in claim 1, wherein the knowledge base includes merge set information.

11. A method as recited in claim 1, wherein the knowledge base includes match configuration information.

12. A method as recited in claim 1, wherein the knowledge base includes reporting information.

13. A method as recited in claim 1, wherein the knowledge base includes change notification information.

14. A method as recited in claim 1, wherein the consolidator application includes JAVA code.

15. A method as recited in claim 1, wherein the consolidator application includes SQL query code.

16. A method as recited in claim 1, wherein the consolidator application includes SQL table creation code.

17. A method as recited in claim 1, wherein the consolidator application includes change configuration code.

18. A method as recited in claim 1, wherein the consolidator application includes merge file code.

19. A method as recited in claim 1, wherein the consolidator application includes match code.

20. A method as recited in claim 1, wherein the consolidator application is a web application.

21. A method as recited in claim 1, wherein the consistency rule that causes a modification of the knowledge base includes generating an action.

22. A system for creating a consolidator for consolidating data from a plurality of database systems comprising:
   a processor configured to:
   receive a user action wherein the user action specifies an action that modifies a knowledge base wherein the knowledge base is used by the consolidator for consolidating data from the plurality of database systems, and includes schema information and matching information relating to the plurality of database systems;
   derive an event from the user action wherein the event causes a first modification of the knowledge base, which in turn triggers consistency rules that cause a second modification of the knowledge base, wherein the consistency rules are that:
      (a) when a master entity is added to the knowledge base, the master entity is required to have (i) a corresponding staged entity, wherein the staged entity data is derived from processing data from one of the plurality of database systems, and wherein said staged entity comprises a staged attribute comprising a cleanse definition, (ii) ordering, and (iii) all ordering attributes;
      (b) when a staged entity is deleted, native attribute and ordering information corresponding to the staged entity is also deleted; and
      (c) in a top down search, there is a level for each master entity;
   define a registry using the modified knowledge base, wherein the registry comprises a master database and a consolidator application;
   validate the registry in accordance with a validation rule selected from the group consisting of:
      (a) that there are no duplicate display names for master entities;
      (b) that a database table name is less than sixteen characters long and only contains valid characters; and
      (c) that a match level must have a match comparison;
      (d) that every native attribute has a cleanse attribute; and
      (e) a combination thereof; and
   generate, based at least in part on the registry, a set of consolidator application computer code, wherein the set of consolidator application computer code (a) includes computer code that interacts with input databases in the plurality of database systems, computer code that interacts with a user of the consolidator, computer code that processes data from the input databases, and computer code that interacts with the master database, and (b) when executed, consolidates data from the input data databases into the master database in accordance with the knowledge base; and
   a memory coupled to the processor and configured to provide instructions to the processor.

23. A system as recited in claim 22, wherein the consistency rule that causes a modification of the knowledge base includes generating an action.

24. A computer program product for creating a consolidator for consolidating data from a plurality of database systems, the computer program product being embodied in a computer readable storage medium and comprising computer instructions for:
   receiving a user action wherein the user action specifies an action that modifies a knowledge base wherein the knowledge base is used by the consolidator for consolidating data from the plurality of database systems, and includes schema information and matching information relating to the plurality of database systems;
   deriving an event from the user action wherein the event triggers causes a first modification of the knowledge base, which in turn triggers consistency rules that cause a second modification of the knowledge base, wherein the consistency rules are that:
      (a) when a master entity is added to the knowledge base, the master entity is required to have (i) a corresponding staged entity, wherein the staged entity data is derived from processing data from one of the plurality of database systems, and wherein said staged entity comprises a staged attribute comprising a cleanse definition, (ii) ordering, and (iii) all ordering attributes;
      (b) when a staged entity is deleted, native attribute and ordering information corresponding to the staged entity is also deleted; and
      (c) in a top down search, there is a level for each master entity;

defining a registry using the modified knowledge base, wherein the registry comprises a master database and a consolidator application;

validating the registry in accordance with a validation rule selected from the group consisting of:
- (a) that there are no duplicate display names for master entities;
- (b) that a database table name is less than sixteen characters long and only contains valid characters; and
- (c) that a match level must have a match comparison;
- (d) that every native attribute has a cleanse attribute; and
- (e) a combination thereof; and generating, based at least in part on the registry, a set of consolidator application computer code, wherein the set of consolidator application computer code (a) includes computer code that interacts with input databases in the plurality of database systems, computer code that interacts with a user of the consolidator, computer code that processes data from the input databases, and computer code that interacts with the master database, and (b) when executed, consolidates data from the input data databases into the master database in accordance with the knowledge base.

25. A computer program product as recited in claim 24, wherein the consistency rule that causes a modification of the knowledge base includes generating an action.

26. A method for creating a consolidator for consolidating data from a plurality of database systems comprising:

receiving a user action wherein the user action specifies an action that modifies a knowledge base, wherein the knowledge base includes schema information and matching information relating to the plurality of database systems;

deriving, using a processor, an event from the user action wherein the event causes a first modification of the knowledge base, which in turn triggers a consistency rule that causes a second modification of the knowledge base, wherein the consistency rule is selected from the group consisting of:

- (a) that when a master entity is added to the knowledge base, the master entity is required to have ordering, all ordering attributes, and a corresponding staged entity, wherein staged entity data is derived from processing data from one of the plurality of database systems, and wherein said staged entity comprises a staged attribute comprising a cleanse definition;
- (b) that when a staged entity is deleted, native attribute and ordering information corresponding to the staged entity is also deleted;
- (c) that in a top down search, there is a level for each master entity; and
- (d) a combination thereof;

defining a registry using the modified knowledge base, wherein the registry comprises a master database and a consolidator application;

validating the registry in accordance with a validation rule selected from the group consisting of:
- (a) that there are no duplicate display names for master entities;
- (b) that a database table name is less than sixteen characters long and only contains valid characters; and
- (c) that a match level must have a match comparison;
- (d) that every native attribute has a cleanse attribute; and
- (e) a combination thereof; and generating, based at least in part on the registry, a set of consolidator application computer code, wherein the set of consolidator application computer code (a) includes computer code that interacts with input databases in the plurality of database systems, computer code that interacts with a user of the consolidator, computer code that processes data from the input databases, and computer code that interacts with the master database, and (b) when executed, consolidates data from the input data databases into the master database in accordance with the knowledge base.

* * * * *